April 1, 1930. T. C. SPELLING 1,753,163
WATER HOIST
Filed Dec. 12, 1928 3 Sheets-Sheet 1
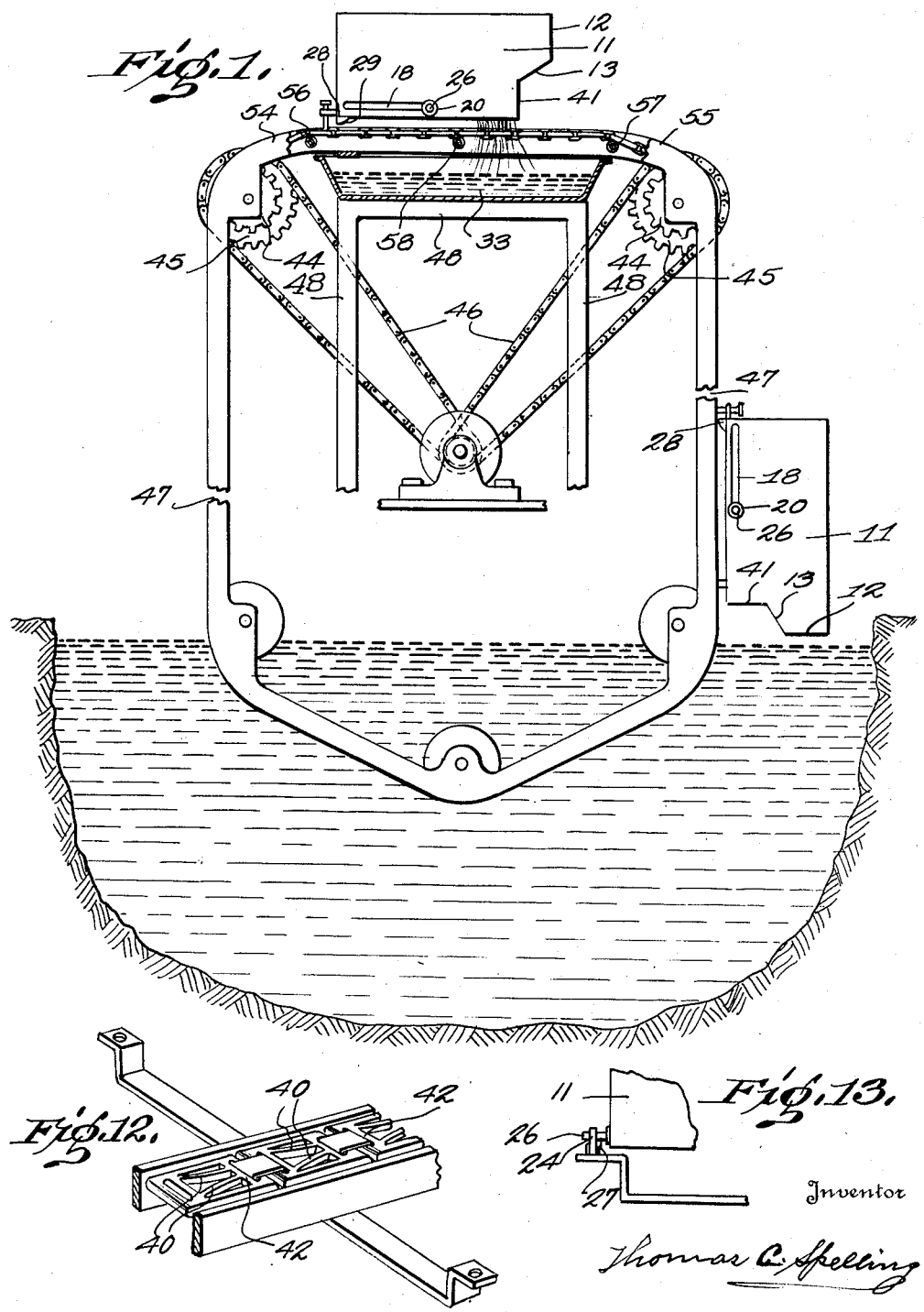

April 1, 1930.   T. C. SPELLING   1,753,163
WATER HOIST
Filed Dec. 12, 1928    3 Sheets-Sheet 2
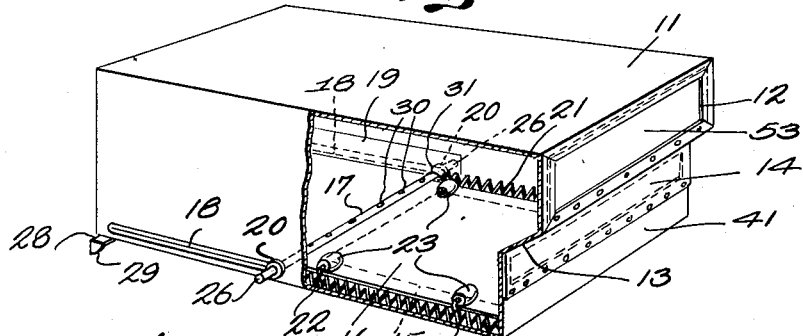
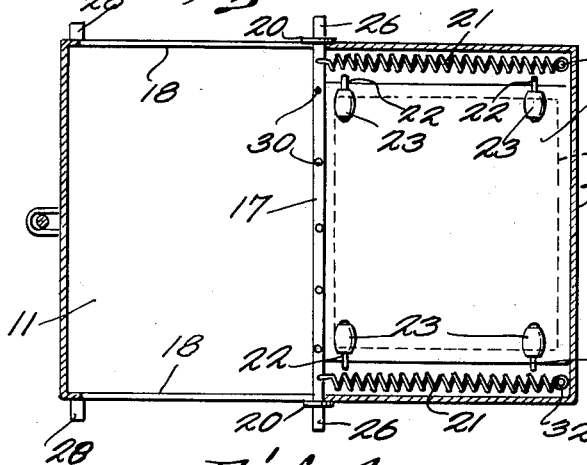
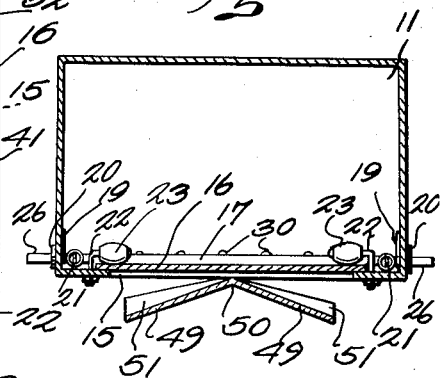
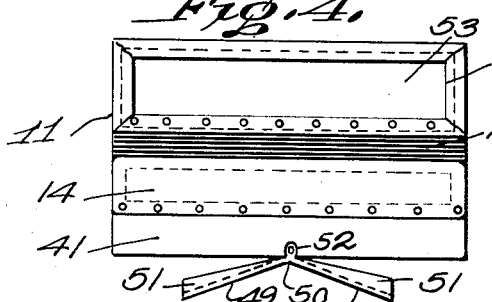
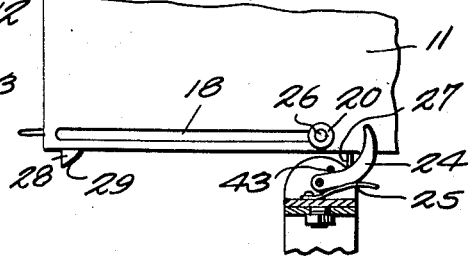
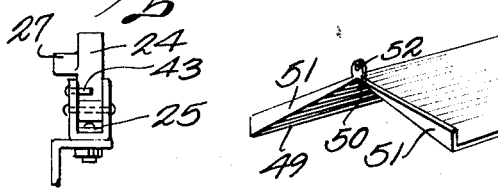
Inventor
Thomas C. Spelling

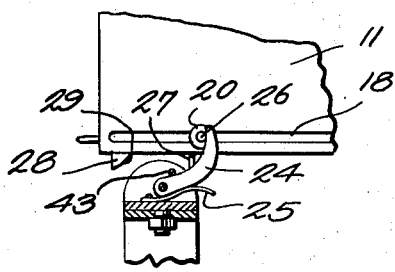
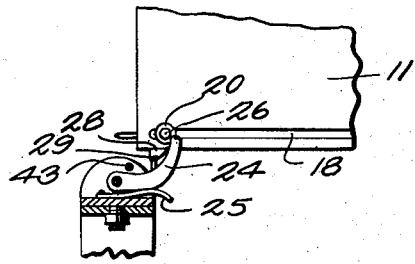
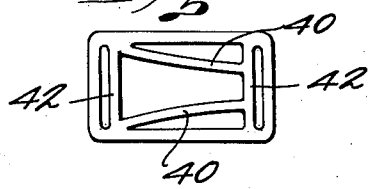
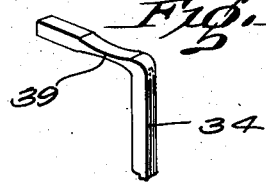
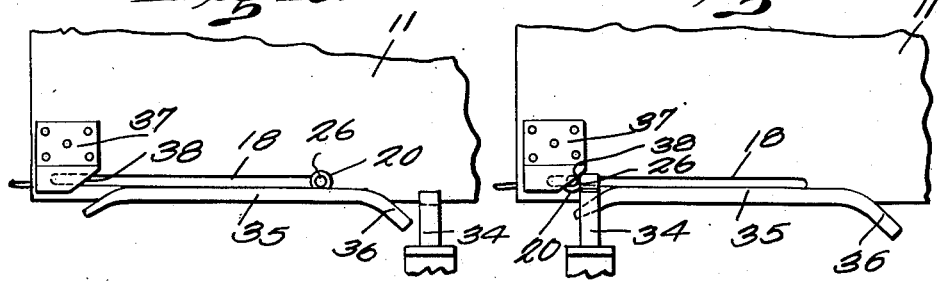
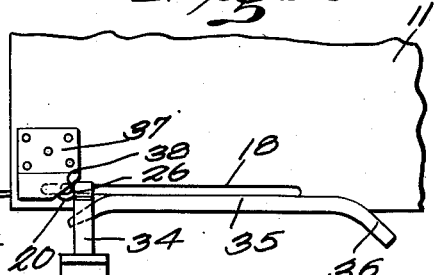
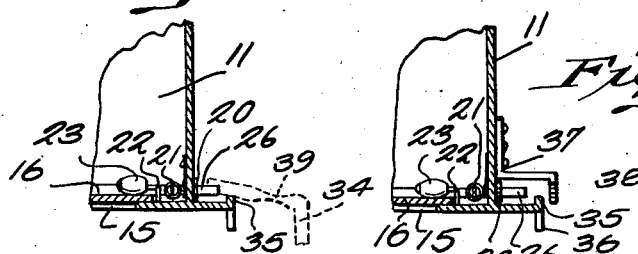
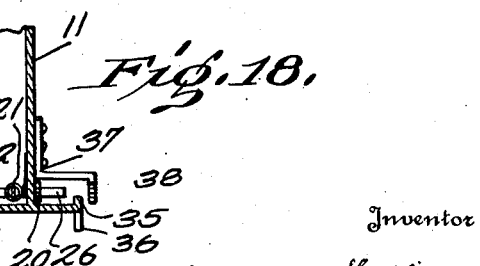
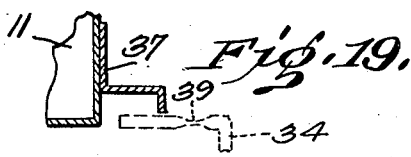

Patented Apr. 1, 1930

1,753,163

UNITED STATES PATENT OFFICE

THOMAS C. SPELLING, OF NEW YORK, N. Y.

WATER HOIST

Application filed December 12, 1928. Serial No. 325,622.

This invention relates to certain new and useful improvements in water hoists, and deals particularly with a device for hoisting from a lower to a higher level large quantities of water, for storage, or to furnish a constant supply, valuable phases or elements of the mechanism being the provision of means for emptying containers of water or other liquids of their contents during continuous forward movement of the containers.

As pointing to the utility of the invention, attention is called to the fact that there is general interest in and discussion of uses for water, including household, municipal, irrigation, stock-watering and mining uses, and especially for generating power, such uses depending upon facilities for hoisting the water rapidly and abundantly.

Other objects and aims of the invention, broader or narrower according to conditions and circumstances, than those stated above together with the advantages inherent, will be in part obvious, and in part specifically referred to in the course of the following description of the elements, combinations, arrangements of parts and application of principles constituting the invention; and the scope of protection contemplated will appear from the appended claims.

In the accompanying drawings which form a part of this specification, similar letters of reference indicate like parts throughout the several views, in which:

Figure 1 is a general elevation of the framework of the hoist minus a superstructural guiding frame, an illustration of which is not necessary for present purposes, some of the operative and stationary parts being shown fragmentarily.

Figure 2 is a perspective view of a container and some of its equipment.

Figure 3 is a plan view of the interior of the nether side of a container.

Figure 4 is a frontal view of a container.

Figure 5 is a sectional view, exhibiting the elliptical rubber rollers and other parts in place.

Figure 6 exhibits a segment of a side of a container and one of the pivoted catches in position to be engaged by the end of a cross-bar; also a disengaging member.

Figure 7 is an end view of one of the pivoted catches.

Figure 8 is a perspective view of the water-shield.

Figure 9 exhibits one of the pivoted catches in engagement with an end of the cross-bar.

Figure 10 exhibits one of the pivoted catches in disengagement upon being struck by a disengaging member.

Figure 11 shows an improved form of a link of the chain.

Figure 12 shows an angle bar support for the stationary disengaging members.

Figure 13 shows the positions of the stationary members relative to the path of the carriers.

Figure 14 is a perspective view of a stationary member whose support is here shown broken off.

Figure 15 exhibits a tapered bar attached to the carrier; also the arm of the stationary member in position to be slid on the tapered bar to engagement with the end of the cross-bar.

Figure 16 shows the position of the arm at the point of its disengagement.

Figure 17 is a fragmentary sectional view of the alternative form of the door actuating means, showing the stationary arm, in dotted outline, riding on the tapered bar and in end contact with the projecting end of the cross-bar.

Figure 18 is a similar view but illustrating the respective positions of the tapered bar, the bevelled face and the projecting end of the cross-bar.

Figure 19 illustrates the position of the horizontal arm after its disengagement from the protruding end of the cross-bar.

For a better understanding, I begin with a comprehensive description of certain essential parts, without specific reference to the drawings or reference numerals. The power is applied to an endless flat linked chain and will move it up on one side and down the other, and around an endless sextangular frame. To the chain are attached containers for water—possibly for other liquids—and these are carried, each in succession upward to a point at which it is emptied into a receptacle. Without even pausing, the container is moved around and over the apex of the frame and downward to the body of water constituting the source of supply. Continuing, the forward movement, each carrier is drawn through the water and around the lower end of the frame, shown in the drawing in submergence, and filled. Continuing the forward movement, it is again drawn upward. Stationary rollers are placed at points shown in the drawings on the lower terminals of the frame. These rollers are axled into the frame and may be formed of iron, steel, wood, or other hard substance. Each roller is formed with a level portion between flanges, one flange at each outer edge. Between the flanges is a band which may be of vulcanized rubber or other pliable material extended around the roller, to accommodate slight contractions or extensions of the chain due to variations in temperature. The toothed wheels shown in the upper angles function, not only as parts of the operating mechanism, but also serve as rollers as effectively as do the rollers in the nether angles.

The major problem being the emptying of the container, 11, into the water basin 33, without halting the former in its forward progress, without tipping or upsetting it and without imparting to the structure and running gear a shock, and with a minimum of friction, that end is attained by use of the elements and parts now described as follows.

The container, 11, having the general form seen in Figure 2, has formed in its lower side the outlet opening, 15, which extends from near the frontal wall, 41, back slightly less than half way to the rear wall, a narrow margin being left integral on the right, left and frontal sides of the opening, as seen in Figure 2, but more clearly in Figure 3. As a closure for this opening, the sliding door, 16, is provided. It will be seen in Figures 2 and 3 to overlap when at rest portions of the margins of the opening left integral on the two sides, and to extend slightly beyond the margin of the area of the bottom of the container left integral back of the opening, but to cover the entire frontal margin.

The sliding door, 16, is preferably a thin metal sheet, which should be copper-alloyed or otherwise suitably treated for preservation from rust, (as should be all metallic parts).

The means for sliding the door back, upon the container reaching the point in its progress at which the content of the container is to be emptied into the basin, 33, as shown in Figure 1, comprise, in part, the cross-bar, 17, to whose lower side is secured, through the apertures, 30, the sliding door. The ends, 26, of the cross-bar, 17, are seen to protrude through the horizontal slots, 18. Since the cross-bar is to have movement in the slots from end to end thereof, therefore to prevent leakage during said movement, the rubber flaps, 19, are attached to the interior of the container, as shown in Figure 2, one at each side. And since the presence of the cross-bar at rest would otherwise prevent a perfect closure of the flaps, the recesses, 31, are made therein to accommodate the presence of the bar; and to prevent leakage around the ends of the bar, the circular collars, 20, are placed around protruding ends thereof.

For the sliding back of the door, 16, and the cross-bar, 17, upon arrival of the container at the horizontal portion of the frame of the structure, the stationary pivoted catches, 24, are erected upon the angle-bar support shown in Figure 12 which is attached to the frame of the structure, shown in Figure 1, one catch on each side of the path of the container, exactly opposite each other. The support is the same for both forms of stationary engaging and disengaging mechanism, hereinafter more definitely described, it being only once illustrated; that is in Figure 12. Confining present description to one only of the catches, it rests on the spring, 25, and its rebound upon release is checked and limited by the small check-bar, 43. Until in forward progress of the container, the protruding end, 26, of the cross-bar, 17, reaches, it, the catch rests on spring, 25. When the catch contacts with said end when in forward movement of the container the bevelled face, 29, attached to the container by plates, 28, is reached, then the bevelled face is engaged by a diminutive wall, 27, the same being an integral part of the catch member. Such engagement releases by forcing downward on the yielding spring the engaging part of the catch. The wall portion is positioned beyond and slightly to the left of the engaging and releasing portion of the catch, as seen in the Figures 6, 7 and 8, so that, after striking, the bevelled face member passes without coming in contact with it.

For the purpose of restoring the cross-bar and sliding door to the positions from which they were moved by the halting and releasing means just described the flat sized zigzag or coiled springs, 21, one on each side, with one end attached through the nether side of the container at 32, are attached by the other end to the cross-bar just beyond the interior corners of the sliding door. The spring members rest each on its edge along the interior surface of the integral margin of the nether side of the container outside the edges of the sliding door, 16, and behind the rollers, 23. As the cross-bar is drawn back by the coaction just described of the parts outside the container, the spring is stretched to the extent of movement backward of the cross-bar; and when the pivoted catch, 24, is disengaged by the bevelled face, 29, the springs react to their former condition and position, drawing the cross-bar, that pushing the sliding door along, each to its former position.

In order to secure continuous contact of the sliding door with the integral margins upon which it is positioned and moved, the four rollers, 23, are provided, two on each side, in contact, with slight pressure, on the sliding door. These are preferably made of rubber or other pliable material, and are each pivoted on an elbowed support, 22, which is extended through the nether side of the carrier, and is bradded or screw-capped outside. Another function of the rollers is to retard movement back to former position of the sliding door, thus postponing closure and allowing more time for running out of the liquid.

The container is formed with the frontal opening, 12, the integral middle portion, 13, and the valvular flap, 14, which is attached exteriorly to the lower side of an opening in the integral portion, 41. The purpose of opening, 12, is of course, to admit liquid at the source of its supply, under and about the lower end of the structure as seen in Figure 1. The integral portion, 41, and the valvular member combined will check and prevent the premature outflow of liquid as the container approaches the basin, 33. The valvular member consists of a flap of thin resilient metal, or other flexible substance, having sufficient resistant strength to prevent the outflow of liquid, but susceptible of being forced outward by any pocket of air which may be present, and to yield to force exerted by action of the inflowing stream. Thus shocks and resultant strain on the running gear of the device, when contact between the mouth of the container and the source of liquid supply occurs, will be avoided. To the lower of the integral margins left on all sides of opening, 12, is attached, interiorly, the valvular flap, 53, similar in flexibility and resisting strength to flap, 14. It yields to the inflow of liquid in process of submergence but obstructs outflow therefrom.

The purpose for which the provision of alternative means for shifting the cross-bar is made will be understood upon reflection that hoists which will be built and used may be of various magnitudes, sizes and capacities. The means already described are effective and ample for a hoist on which containers of small or moderate width and content-capacity are used. In such case there is only a negligible variation from steady level advance of the container, and dependence may be placed upon uniform and effective engagement of the pivoted catch with the end of the cross-bar, even without use of the superstructural guiding means. But where a container of relatively large capacity, hence increased width, is used even in connection with a superstructural guide thereon, or end steadying bar, and relatively wide linked chain, there will be irregularity of motion sidereally as well as vertically, sometimes designated as wobbling. Therefore for clear reasons, the alternative means afford a wider range of adaptation for accomplishing the end in view, where larger forms of containers are used.

In functioning for the purpose in view, the arms, 34, of the stationary member, one on each side, of the alternative means must be positioned exactly opposite each other, and with sufficient precision relative to the tapered bar, 35, upon which, by the forward movement of the carrier, it is slid, to contact with the end, 36, of the cross-bar. This member must be of resilient metal. The horizontal arm is thin enough near its connected support to yield vertically, but so broad that it will be rigid laterally. Said tapered bar is suitably supported on the container, as seen in Figures 15 and 16, its horizontal portion is positioned evenly with the nether side of the end, 26, of the cross-bar. The end, 36, of the tapered bar, 35, is reached by the stationary arm simultaneously with the striking of the arm, 34, against the bevelled face, 38. In the alternative means, the bevelled face must be positioned outside the track of the end of the cross-bar, otherwise it would be struck by the latter and would not effect disengagement of the arm, 34. Its support, 37, upon the side of the container extends outwardly and then downwardly as seen in Figure 18. The position of arm 34, after its contact with the bevelled face is that shown at the reference numeral 38, and is such that, upon arrival of another container, its performance is repeated. In functioning it is slid upward to where the end, 26, of the cross-bar strikes it, at the beginning of the horizontal face of the tapered bar. The cross-bar having been held by it until the bevelled face is reached, the latter disengages it, freeing the crossbar to be pulled back to original position by reaction of the springs, 21. In such functioning the resilient neck, 39, of the arm is actuated.

If the mechanism be of such form or dimension as to require a superstructural guide, it may be supported on the frame and extended around the frame. Axles may extend through the upper portion of each container, the axles carrying rollers on the ends into a groove or trench attached to vertical supports. But, ordinarily, no superstructural guide will be needed. The chain, as emplaced and operated on the rubber tires before mentioned, is taut; the links of the chain will be wide and flat. Each container is supported on and attached to the chain, at each end of the container by a bifurcated leg, each prong suitably attached to a side of a link of the chain; so that it would require a considerable shock to carry the centre of gravity outside the chain far enough and for duration of time sufficient to cause an upsetting of a container.

The improvement of the chain is with a view to securing even and steady engagement of the toothed wheels, with the chain and with each link thereof. This purpose is attained by forming each link with the additional interior curved parts, 40, as seen in Figure 11. These parts are integrally formed in forging the links, as is also the interior integral portion 42.

I now call attention to the toothed wheels. In all water-hoisting facilities with which applicant is familiar, the power is applied either at the apex or at the base of the structure, and to a single wheel. That throws an undue strain on that side of the frame on which the filled containers are moved. Here two tooth wheels are provided, one on each side, turned in the same direction, distributing the strain. Here, the tooth wheels, 44, are each axled on a common axle with a larger wheel, 45, and positioned in a side angle of the frame. The larger wheel to which the chain pulley, 46, is applied is positioned outside the frame. The actuating means to which power is applied is here the chain pulley, 46. The angles are all obtuse, as shown in Figure 1; that is to say, they are rounded to allow passages, without contact, of the containers. Also to facilitate unobstructed movement of the containers, two other obtuse angles, 54 and 55 are formed in the apex, and under the chain in each are positioned and axled in the frame the small rollers, 56 and 57.

To prevent saturation of the frame by the outflow of liquid from the container, as well as splashing and spraying, the water-shield shown perspectively in Figure 8 is provided. It is formed with the two wings, 49, slanted obliquely downward. At the juncture of the two wings is the acutely formed apex, 50. The lateral margins are turned up, at 51, to prevent the liquid spilling over the margins on the frame. In place, it is secured to the nether side of the container, the acute apex, 50, extended centrally under the opening, 15. The watershield is secured to the container through the apertures, 52, one end immediately at the juncture of the integral portion of the front, 41, the other end just back of the sliding door, 16, as the latter is positioned at rest, the apertures being shown in Figure 8. A sectional view of the two wings in position may be seen in the sectional Figure 5, and a frontal view in Figure 4.

The middle portion of the frame is here shown broken out at 47; also the supporting structure for the frame is absent. It is not believed that it can possess any patentable novelty, and its description and illustration would merely cause confusion, increasing the field of discussion and illustration. Anyhow, the main structural support extends into the earth or other sub-support, beneath the liquid supply. The basin, 33, is supported on the broken off member, 48, which, in turn, is supported on the main support of the structure in place. Obviously, where water is to be hoisted out of a canyon or subterranean supply, the structure may be suspended from a bridge or other upper support.

After what precedes, nothing further need be said as to the operation of the improved device. The purposes of the interior formations of the chain links, and of positions of the toothed wheels have already been herein stated.

What I desire to secure by United States Letters Patent is:

1. In an apparatus of the character described, the combination with a container having horizontal slots in the sides thereof and an open bottom portion, of a sliding door for the bottom portion, and means for operating the sliding door through the slots in the sides of the container including pivoted catches near the path of movement of the container, substantially as and for the purpose described.

2. In an apparatus of the character described, the combination with a container having horizontal slots in the sides thereof and an open bottom portion, of a sliding door for the bottom portion, and means for operating the sliding door comprising bar extensions attached to the sliding door and projecting through the slotted sides, and pivoted catches normally in the path of movement of the bar extensions, substantially as and for the purpose described.

3. In an apparatus of the character described, the combination with a container having an opening in its lower portion, a door operatively associated with said opening, a spring pressed pivoted catch near the path of movement of the container adapted to engage and operate the door, and a beveled face member on the container positioned to engage a part of the catch to release the same, substantially as and for the purpose described.

4. In an apparatus of the character described, the combination with a container having an opening, a door therefor, a spring pressed catch for operating the door, a check for preventing overthrow of the catch when not engaging the door, and means on the container for releasing the catch from operative engagement with the door, substantially as and for the purpose described.

5. In an apparatus of the character described, the combination with a container having an opening, of a sliding door therefor arranged within the container, a cross bar attached to the sliding door, oppositely positioned pivoted catches for engaging the cross bar to operate the door, and a beveled faced member on the container for disengaging the pivoted catches from the cross bar, substantially as and for the purpose described.

6. In an apparatus of the character described, the combination with a container having slotted sides and a bottom opening, of a sliding door for the latter arranged within the container and having bar extensions passing through the slotted sides, catches for engaging the bar extensions to operate the door in one direction, and coil resilient members attached interiorly to the container and to the bar extensions for moving the door in an opposite direction, substantially as and for the purpose described.

7. In an apparatus of the character described, a liquid container formed with a cut-out portion at one end providing an upper relatively projecting end portion, an intermediate portion receding inwardly, and a lower portion, said upwardly projecting and lower portions having openings therein, an inwardly opening flap valve associated with the opening in the upper portion, and an outwardly opening flap valve associated with the opening in the lower portion, substantially as and for the purpose described.

8. In a machine of the character described, a container for liquids, the forward end of the container being formed with relatively upper and lower openings, and flexible flap valves for said openings, one arranged to open inwardly and the other outwardly, substantially as and for the purpose described.

9. In an apparatus of the character described, a container for liquids having an outlet opening and slotted walls, a door for said outlet opening having parts movable in the slotted walls, and means for sealing the slotted portions as the door moves comprising flexible flaps engageable with the parts moving in the slotted walls and closing the slots, substantially as and for the purpose described.

10. In an apparatus of the character described, a container for liquids having an outlet opening and slotted walls, a door for said outlet opening having parts movable in the slotted walls, and sealing means comprising flexible flaps engageable with the parts moving in the slotted walls and closing the slots, and collars positioned around the protruding portions of the parts moving in the slotted walls, substantially as and for the purpose described.

11. In an apparatus of the character described, a container for liquids having an outlet, a door for said outlet, means whereby the door may be opened, means for closing the door, and means for substantially retarding the movement of the door in its closing operation, substantially as and for the purpose described.

12. In an apparatus of the character described, a container for liquids having an outlet, a door for said outlet, a spring for closing the door, means for opening the door, and pressure rollers yieldably engaging the door to retard the movement of the door in its closing operation, substantially as and for the purpose described.

13. In an apparatus of the character described, a container having an open discharge portion, and means for dividing the discharge into two streams comprising a member centrally positioned with reference to the discharge and having oppositely arranged downwardly slanting wings, said wings being flanged at their ends, substantially as and for the pupose described.

14. In an apparatus of the character described, a container, conveyor chain therefor, and means for operating the chain including a toothed wheel, said chain comprising links formed with longitudinally converging inwardly disposed edge portions whereby the links will engage centrally and near one end thereof the teeth of the toothed wheel.

THOMAS C. SPELLING.